June 12, 1928.
E. MAYER
1,672,897
STARTING CONNECTION FOR ALTERNATING MOTORS
Filed Jan. 9, 1924      3 Sheets-Sheet 1
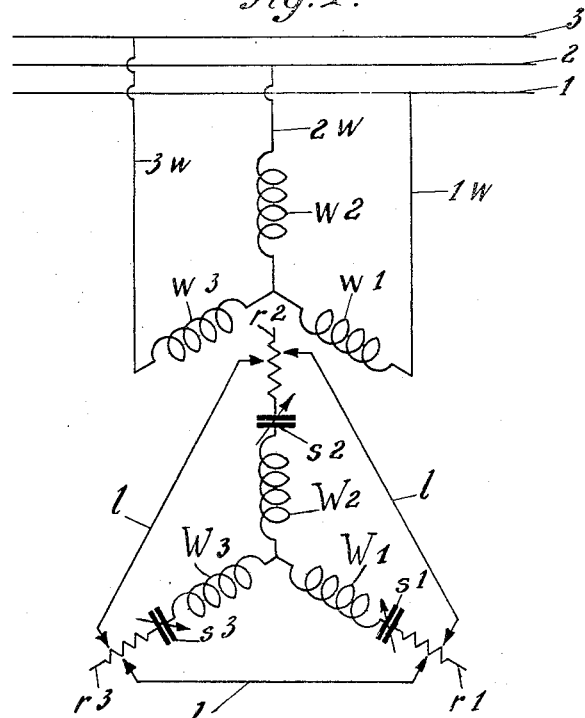
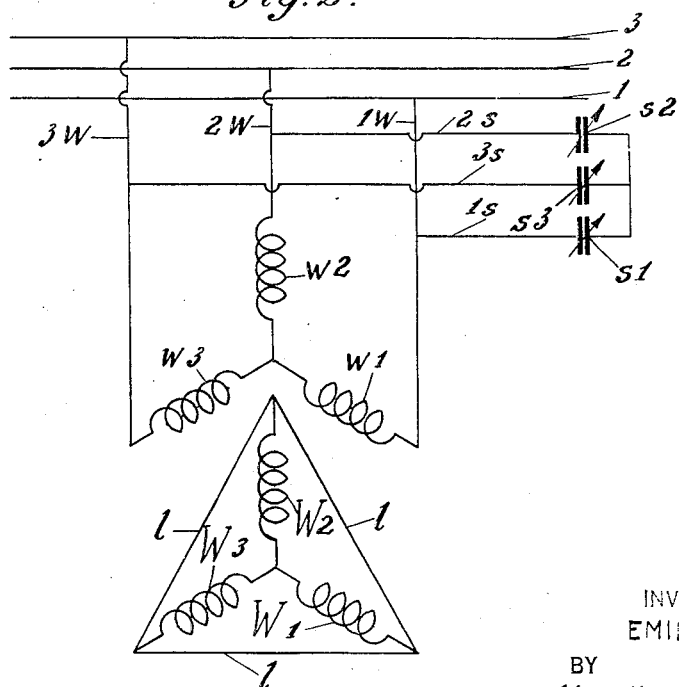
INVENTOR
EMIL MAYER.
BY
ATTORNEY June 12, 1928.

E. MAYER 1,672,897

STARTING CONNECTION FOR ALTERNATING MOTORS

Filed Jan. 9, 1924      3 Sheets-Sheet 2

INVENTOR
EMIL MAYER.
BY
H. P. Van Deventer
ATTORNEY

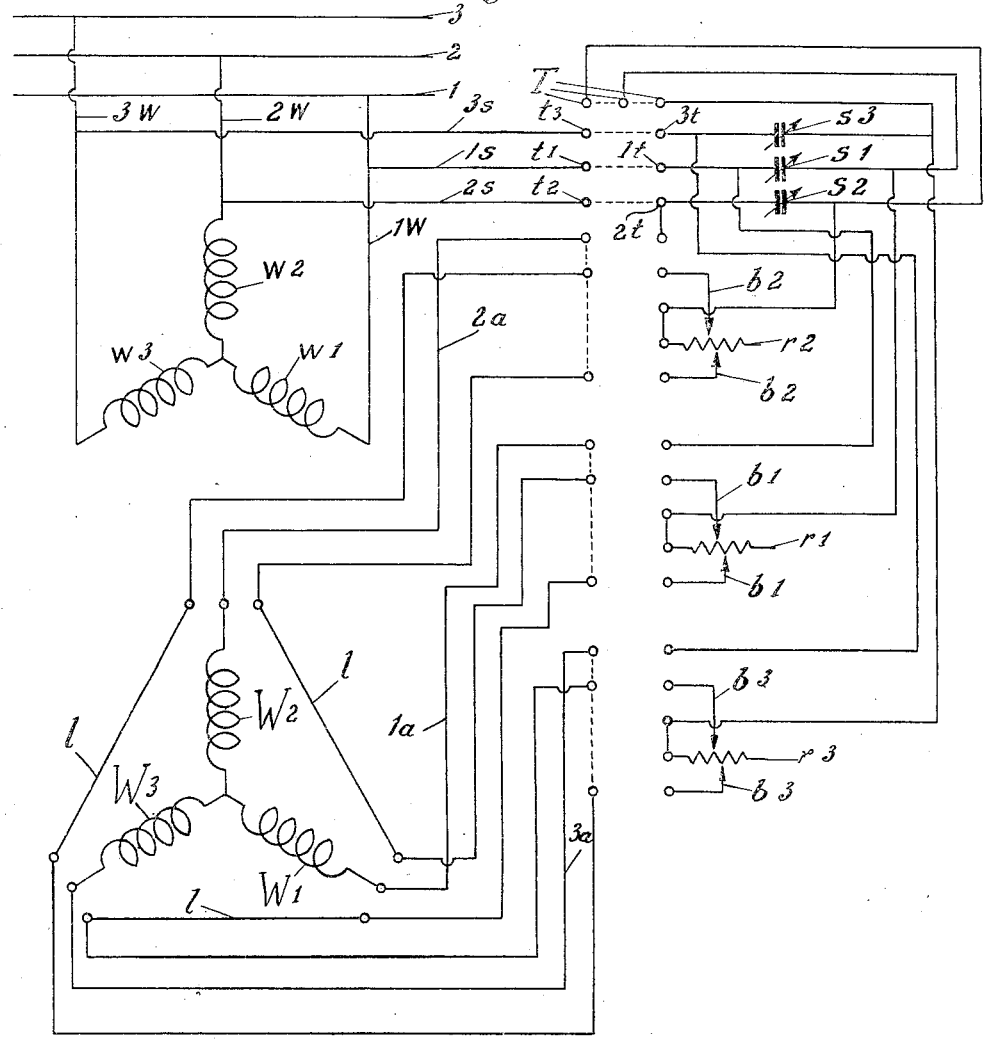

Patented June 12, 1928.

1,672,897

UNITED STATES PATENT OFFICE.

EMIL MAYER, OF BERLIN, GERMANY.

STARTING CONNECTION FOR ALTERNATING MOTORS.

Application filed January 9, 1924, Serial No. 685,212, and in Germany October 31, 1923.

My invention relates to improvements in starting apparatus for electric motors, particularly alternating current motors having either wound or unwound rotors.

An object of my invention is to provide a starting arrangement for alternating current motors using electrical condensers either alone or in combination with resistances; with the result that I can obtain larger torque with smaller starting currents, because the condensers influence the phase of the starting current more strongly than a resistance; and thus with a given current, a larger torque can be developed.

A further object of my invention is to provide a method of starting alternating current motors adapted to permit the phase-compensation condensers employed with alternating current motors of this and other types, to be utilized for purposes of starting; and after starting to be restored to their proper relations in the circuit to function as phase-compensation condensers for the regular operation of such motors.

Other objects and advantages of the invention will appear from the following description, which shows connections and circuits according to my invention; but it is to be understood, however, that this disclosure is illustrative only and I do not wish to be necessarily limited to what is described, or shown upon the drawings, and I reserve the right to make any changes which come within the scope and spirit of the invention as the same are indicated in the appended claims.

Fig. 1 is a diagrammatic view, showing an arrangement of circuits for starting an alternating current motor with a wound rotor.

Fig. 2 is a view showing the connections for such a motor when in regular operation.

Fig. 3 is a view showing the same conditions as Fig. 1, but with switch terminals for controlling the connections, included, and.

Fig. 4 is a view similar to Fig. 2, but with switch terminals included and connections established for regular operation of the motor under load.

Figure 3:
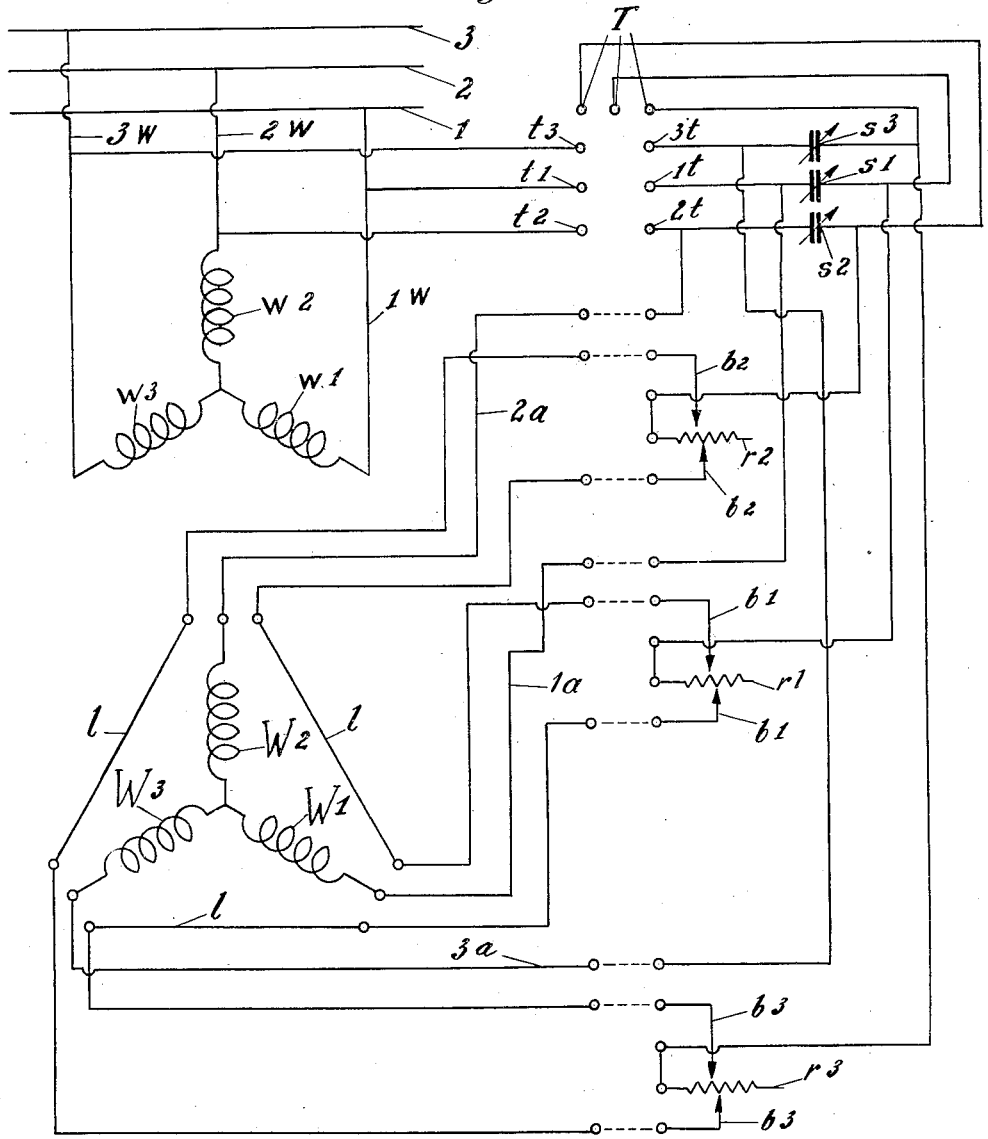

In the drawings, the invention is illustrated in connection with alternating currents of three phases, but obviously, I may practice the invention with motors taking current of a different number of phases; and in fact, with alternating current motors in general, after the manner set forth in the actual embodiment of my invention which is here presented for purposes of explanation.

For alternating current motors having wound rotors, I may arrange the starting connections as shown in Figs. 1 and 2. In Fig. 1, are windings $w^1$, $w^2$ and $w^3$ connected in star across the main leads, for the field of the motor, or stator; and for the rotor, I employ similar winding, $W^1$, $W^2$ and $W^3$, connected in star with one terminal of each winding joined to a common point, and the other terminal of each winding being united to a condenser and adjustable resistance in series, the condenser and resistances for each winding being indicated by the characters $s^1$, $r^1$, $s^2$, $r^2$ and $s^3$, $r^3$. Conductors 1 are employed to bridge the extremities of each two of the windings in delta, the extremities of the conductors 1 being adjustably connected to the resistances.

With the connections I have shown in Fig. 1, the motor can be started with the advantage of a large starting torque for a relatively small current. After starting the connections are changed and made as shown in Fig. 2. The windings are in Y as before on both the stator and the rotor, but the resistances are cut out and the condensers thrown over from the rotor to the stator, being joined in Y by the conductors $1^s$, $2^s$ and $3^s$ across the wires $1^w$, $2^w$ and $3^w$, uniting the stator windings to the main leads.

For conveniently controlling the connections, I can proceed as in Figs. 3 and 4. Of course in practice the resistances and condensers will not be carried upon the rotor of the motor, but will be mounted stationary at any convenient point, and ordinary slip-rings and brushes may be employed to connect them to the motor windings, with switches to disconnect them after starting has been effected. For example, the winding $W^1$, may be joined through a lead $1^a$, to a switch terminal and in the line of this lead and on the motor shaft may be a slip-ring with a brush running thereon, such a slip-ring and brush not being shown in the drawing, because the use of slip-rings to control resistances used in connection with such motor windings is well-known to those skilled in this art. Similarly the windings $W^2$ and $W^3$ are joined through conductors $2^a$ and $3^a$ to switch terminals through separate slip-rings and brushes. Also with the lead $1^a$ are associated leads joining the two terminals of the conductors 1 adjacent the outer terminal of the winding W¹, through slip-rings and brushes, to separate terminals adjacent the terminal for the remote extremity of the lead 1ª. Similar leads run from the terminals of the conductors 1 adjacent the outer end of the winding W², along with the lead 2ª, to switch terminals adjacent the terminal to which the lead 2ª is connected; and the extremities of the conductors 1 adjacent the outer terminal of the winding W³ run through slip-rings and brushes to terminals adjacent the terminal for the lead 3ª; all the switch terminals mentioned being arranged in a vertical line as Fig. 3 indicates. On the other side of this line are co-operating switch terminals to enable the condensers $s^1$, $s^2$ and $s^3$ and resistances $r^1$, $r^2$ and $r^3$ to be thrown in or cut out as desired. For example, opposite the switch point for the terminal 1ª, will be a switch terminal united to one pole of the condenser $s^1$ and the other pole of this condenser $s^1$, will be joined to the one end of the adjustable resistance $r^1$; and opposite the switch terminals for the two leads running from the ends of the two conductors 1 at the same extremity of the winding W¹ as the lead 1ª, will be switch terminals each united to movable brushes $b^1$, to slide along the resistance $r^1$. Now, if these three pairs of terminals be connected as indicated by horizontal dotted lines, obviously the condenser $s^1$ and resistance $r^1$, will be joined to the winding W¹, and to the adjacent extremities of the two adjacent conductors 1, in the same manner as shown in Fig. 1. The like connections are made for the two outer terminals of the windings W² and W³ and the adjacent extremities of the conductors 1, all as indicated by the horizontal broken lines passing through one switch point to a switch point opposite in the two vertical rows of switch terminals which Fig. 3 presents. Then the stator windings are disconnected from the condensers and the rotor windings have the condensers, which may also be adjustable, and the variable resistances included.

After starting and for the cutting out of the resistances and the condensers from the rotor windings, and the throwing in of the condensers into the stator windings, I may employ the switch terminals T, which are three in number, joined each to one terminal of one of the condensers; and the terminals 1ᵗ, 2ᵗ and 3ᵗ, each joined to the opposite pole of one of the condensers. See Fig. 4. Beside these three terminals which are shown in vertical alinement above the resistances, are three other terminals $t^1$, $t^2$ and $t^3$, also shown in vertical alinement with the terminals permanently connected to the leads 1ª, 2ª and 3ª; and by connecting the three terminals T together, also the terminal 3ᵗ to the terminal $t^3$, the terminal 1ᵗ to the terminal $t^1$, and the terminal 2ᵗ to the terminal $t^2$, the three condensers will be united through the wires 1ˢ, 2ˢ and 3ˢ, with the stator windings, and disconnected entirely from the rotor. Under these circumstances, the connections for normal running are now established. Broken horizontal lines are employed in Fig. 4 to show the connections for the condensers with the stator, and broken vertical lines are also employed to indicate that now the switch terminals to which the leads 1ª, 2ª and 3ª are permanently joined, must be connected, as indicated by vertical lines, each to the adjacent switch points for the associated leads from the terminals of the conductors 1. Then the rotor has its windings united directly at the outer end of each to the adjacent terminals of the two conductors 1, and regular running is permitted. As before, I can use a single rotary member to control the two sets of vertical switch contacts, indicated in Fig. 4, if desired.

If the choice of the electrical tension used with the rotor windings at starting is unlimited, I can choose this tension with a view to the greatest possible utilization of the condensers. Otherwise, it is possible for the advantageous utilization of the condensers to connect in a transformer, which, in consideration of the shortness of the starting period, can be small. Such a transformer will be inserted between the motor connections and the three leads 1, 2 and 3 and as such transformers are in use and well-known, I do not show an example of them here, or further describe same.

It is apparent that the condensers after starting are all employed in the usual way as phase-compensation condensers; and during starting both the condensers and the resistances can be adjusted or varied step by step by suitable controlling means not shown in the drawings, but very easy to include, because as already stated the condensers and resistances will not be mounted upon the rotor, but will be supported in stationary relation and connected to the rotor windings when switches are used, through rings on the rotor shaft; but it is essential that the condensers be employed and stressed at starting, in a different manner and to a different degree than when the motor is in normal operation. At starting, the condensers should have greater capacity; and for this purpose, each of the condensers $s^1$, $s^2$ and $s^3$ may, if desired, consist of a group of small units, arranged so that the connections of the units of each condenser, can be changed to connect such units in series or parallel at will, and thus vary the capacity to advantage, according to the extent desired.

Having described my invention, what I believe to be new and desire to secure and protect by Letters Patent of the United States is:—

1. The herein described process for starting alternating current motors having windings on both the rotor and stator thereof, which consists in connecting condensers to the windings of the rotor, and after starting, connecting said condensers to the windings of the stator.

2. The herein described process for starting an alternating current motor, having windings on both the stator and rotor, which consists in connecting condensers and resistances to the windings of the rotor, and after starting cutting out the resistances and connecting the condensers to the stator windings.

3. A process for starting alternating current motors having windings on both rotor and stator thereof which consists in connecting condensers in series with the windings of the rotors and after starting, connecting said condensers in parallel with the windings of the stator.

4. A process for starting and operating asynchronous alternating current motors having windings on both the rotor and the stator thereof which consists in connecting condensers to the windings of the rotor for starting to reduce the starting current, and after starting connecting said condensers to the windings of the stator to improve the power factor of the motor.

In testimony whereof I affix my signature.

EMIL MAYER.